Dec. 16, 1958 N. PRITIKIN 2,864,926
ELECTRICAL COMPONENT AND METHOD OF MAKING SAME
Filed Oct. 19, 1954 2 Sheets-Sheet 2

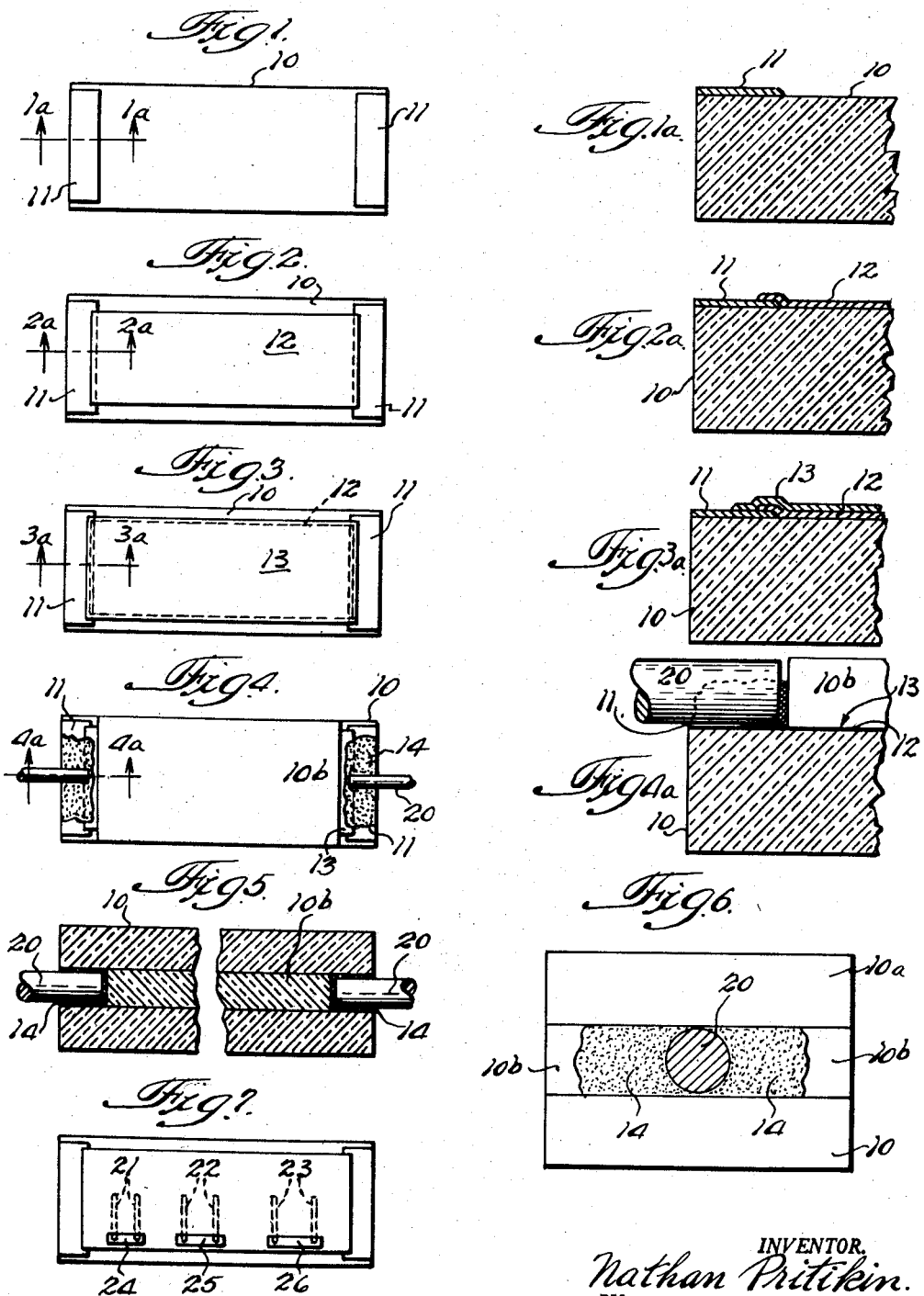

INVENTOR.
Nathan Pritikin.

United States Patent Office 2,864,926
Patented Dec. 16, 1958

2,864,926

ELECTRICAL COMPONENT AND METHOD OF MAKING SAME

Nathan Pritikin, Chicago, Ill.

Application October 19, 1954, Serial No. 463,303

6 Claims. (Cl. 201—73)

This invention relates to an electrical component and a method of making the same, and it is an object of the invention to provide an improved article and method of that character.

This invention is an improvement over the electrical component and method disclosed and claimed in application Serial No. 338,207, entitled Electrical Component and Method and Apparatus for Producing Same, filed February 24, 1953, by the same inventor, and the electrical resistors and methods disclosed and claimed in application Serial No. 299,797, entitled Electrical Resistor and Method and Apparatus for Producing Resistors, filed July 19, 1952, by the same inventor, and in application Serial No. 225,382, entitled Electrical Resistor and Method of Making Resistors en Masse, filed May 9, 1951, now U. S. Patent 2,796,504, by Nathan Pritikin and Harold Weinstein. Various features of the invention disclosed herein are disclosed and claimed in one or the other of said applications.

In accordance with the preferred embodiment of the present invention a pair of spaced-apart metallic films are fused to one surface of each of two preformed sheets of insulating material, preferably glass. An electrical element, for example, a resistor, a capacitor, an inductor, or an element incorporating semiconductive materials such as a rectifying diode or a transistor, can be deposited upon or otherwise applied to one or more of the four principal surfaces of the two sheets of insulating material. The two sheets are then arranged in spaced-apart, face-to-face relationship with the fused metallic films generally facing each other and with the ends of leads extending into the space between the sheets and in contact with facing metallic films. The entire assembly can then be heated to solder the leads to the corresponding metallic films, whereby the entire assembly is firmly bonded together.

An electrical component produced in this manner has great mechanical strength, and where the electrical element is arranged on one of the inner surfaces of the two sheets of insulating material, the element is protected from physical harm by hard insulation. Furthermore, an electrical component constructed in this manner can readily be substantially hermetically sealed whereby the electrical element is thoroughly protected from the deleterious effects of moisture or humidity.

Accordingly, it is another object of the invention to provide an improved electrical component of great mechanical strength. It is another object of the invention to provide an improved method for producing such a component.

It is another object of the invention to provide an improved electrical component which is substantially hermetically sealed. It is another object of the invention to provide an improved method for producing such a component.

The electrical component which constitutes one feature of the present invention lends itself to production en masse. Several hundred components or component portions may be produced in the form of a single large sheet of insulating material. Most of the operations necessary to the production of the components or the component portions may be performed on the single large sheet, whereby the cost per component of each operation becomes the cost of the operation divided by the large number of components or component portions being produced in the single large sheet.

Accordingly, it is another object of the invention to provide an improved electrical component which lends itself readily to production en masse. It is another object of the invention to provide an improved method for producing a component en masse.

It is another object of the invention to provide an electrical component having the characteristics defined above while being less costly to manufacture than previously known components.

This invention, together with further objects and advantages thereof, will best be understood by reference to the following description taken in connection with the accompanying drawings, and its scope will be pointed out in the appended claims.

In the drawings, in which like parts are designated by like reference numerals,

Figure 1 is a plan view of an electrical component portion in the first stages of production in accordance with one embodiment of the invention;

Fig. 1a is an enlarged partial cross-sectional view taken along the line 1a—1a of Fig. 1;

Figure 8:
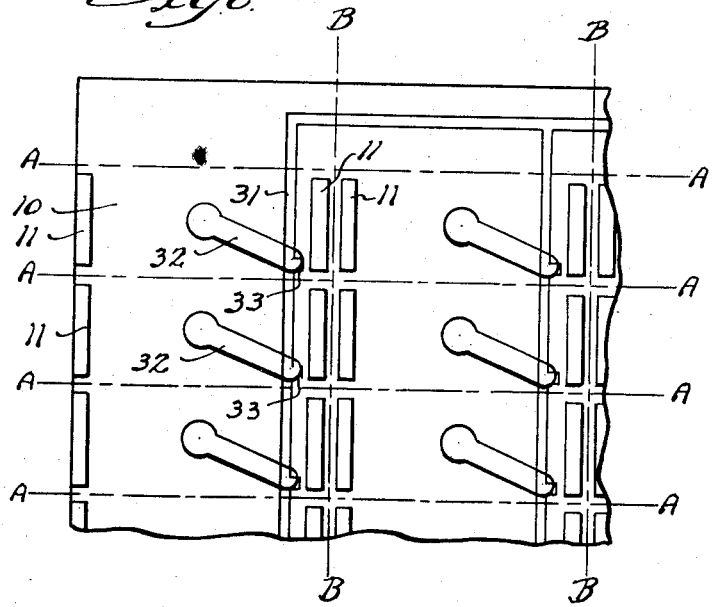
Figure 9:
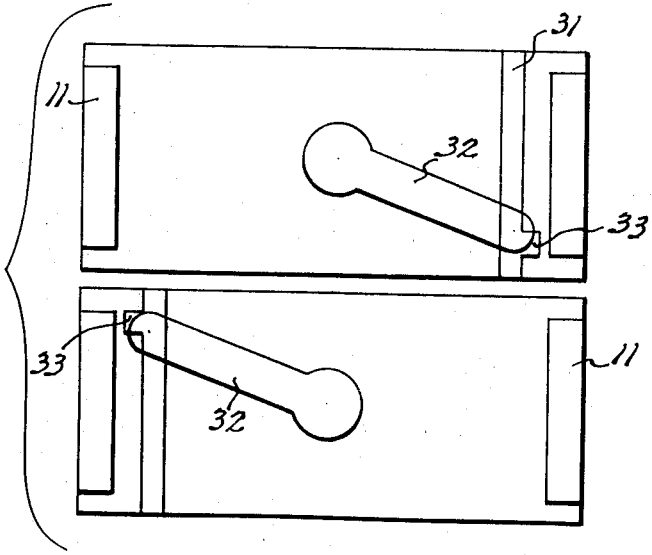

Figs. 2, 3, and 4 are plan views of the same electrical component portion illustrated in Fig. 1, but showing subsequent stages of production;

Figs. 2a, 3a, and 4a are enlarged partial cross-sectional views corresponding to Figs. 2, 3, and 4, respectively;

Fig. 5 is an enlarged cross-sectional view of a complete electrical component constructed in accordance with one embodiment of the invention;

Fig. 6 is an enlarged end view of the complete component of Fig. 5;

Fig. 7 is a plan view of a resistor sheet illustrating adjustment means;

Fig. 8 is a plan view of a large plate incorporating a number of sheets such as those shown in Figs. 1–4; and Fig. 9 is a plan view of two sheets taken from the large plate of Fig. 8.

In the drawings an electrical resistor is illustrated in various stages of production in accordance with one embodiment of the invention. It will subsequently be appreciated that the invention lends itself readily to the production of other forms of electrical components, such as capacitors, inductors, and components incorporating semiconductive materials such as rectifying diodes and transistors.

The invention as illustrated in the drawing is in one of its more inclusive forms, incorporating various features which result in optimum characteristics of the completed component. As is explained below, the invention is applicable to much simpler embodiments which have the advantage of low cost at the expense of certain characteristics of the completed article.

In Fig. 1 there is shown a glass sheet 10, which may alternatively be of various other insulating materials, including, for example, quartz, ceramics, and various synthetic plastics and organic plastics. The sheet 10 shown in Fig. 1 may be very small, for example ½″ x ¼″, and is preferably a part of a much larger glass plate, which latter is cut into ½″ x ¼″ pieces following the completion of all operations which can be performed while the large plate is intact, all as described in detail in applications Serial Nos. 338,207 and 299,797 referred to above.

A pair of terminals 11 are shown in Fig. 1 which are preferably metallic films fused to the glass sheet 10. A recommended mixture for the terminals consists of 10% of finely ground glass frit and 90% silver flake. This mixture may be arranged in a carrier consisting of 20% ethyl cellulose and 80% pine oil, the glass frit and metal particle mixture being mixed with the carrier in about equal parts or to the consistency desired.

This mixture of glass, metal and carrier may be applied to the glass plate 10 by printing, screening, painting or rolling, which processes are well understood in the art. Preferably, the mixture is screened on because of the greater accuracy obtainable by this method.

After the mixture has been screened onto the sheet 10 and the solvent has been permitted to evaporate or has been baked out, the sheet is fired at a temperature which will soften the glass frit. This bonds the silver flake firmly onto the glass sheet, the residue of the carrier being burned off.

This entire operation, like most of those subsequently to be described, is preferably performed on a large glass plate incorporating several hundred of the individual glass sheets 10, as suggested above.

A resistance film 12 may next be applied to the sheet 10. Depending upon the results desired, the resistance film may be applied, for example, by the evaporation of a suitable metal or by printing, painting, screening, spraying or rolling on a resistive material. This resistive material may be in final form as applied or may require baking, fusing to the glass, scraping or cutting to produce a desired configuration, or other operations. It is to be understood that the present invention is not directed primarily to a type of resistance material or configuration employed, but to an over-all electrical component and to the method of making the same. According to the preferred embodiment, and where a resistor is to be produced, the resistance film 12 is pure chromium applied in a vacuum chamber by evaporation.

It will be noted in Fig. 2 that the resistance film 12 overlies portions of the terminals 11 of the sheet 10 in order to make electrical contact therewith. Accordingly, current resulting from voltage applied to the terminals 11 must flow along the entire length of the resistance film to pass from one terminal to the other.

While the sheet 10 is still in a vacuum chamber, following the evaporation of the resistance film 12, a coating of silicon monoxide or magnesium fluoride is preferably applied by evaporation. A very thin film of such material serves to protect the metallic deposition from oxidation upon exposure to atmosphere. Silicon monoxide, which is preferred, is particularly effective because any oxygen which later tends to penetrate the silicon monoxide is captured by that material to form silicon dioxide.

The preferred methods of evaporating the metallic resistance film 12 and the protective coating, and the special materials recommended herein are disclosed in detail and are claimed in applications Serial Nos. 338,207 and 299,797 referred to above. Since these methods and the materials employed do not constitute features of the present invention and since the evaporation of metals and other materials is well understood in the art, they are not described in detail herein.

The thin coating of silicon monoxide or magnesium fluoride can be deposited over the entire sheet 10 including the terminals 11. The rough finish of the terminals 11 prevents the formation of a continuous film of silicon monoxide or magnesium fluoride thereon, whereby electrical contact with the terminals may readily be obtained in spite of the coating. On the contrary, the resistance film deposit 12 is extremely smooth since it is deposited on smooth surfaced glass. Accordingly, the silicon monoxide or magnesium fluoride forms a continuous film over the resistance film 12 and provides complete protection from the atmosphere.

While the protective coating provides protection against oxidation of the resistance film by the atmosphere, it is normally too thin to provide adequate electrical insulation. Accordingly, a coating of high quality varnish 13 is applied by printing, painting, rolling, or screening (see Fig. 3). This coating may be several mils thick and provides adequate electrical insulation in conventional applications. It is to be noted that the varnish coat 13 does not overlie any major portion of the terminals 11 since the varnish would prevent or make difficult electrical contact with the terminals. Preferably, however, the varnish coat 13 extends over the entire area of the resistance film 12.

A solder paste is next applied to the exposed portions of the terminals by printing, painting, rolling, or screening to a depth of about twenty mils. One suitable paste for this purpose is pure tin powder mixed with a rosin type flux to form a paste. For convenience in handling, this paste is allowed to dry or harden or is baked dry by subjecting the entire glass plate to a temperature of 250° F. for 20 minutes.

This portion of the electrical component is complete at this point and the large plate may be cut into strips, each of which contains a single row of glass sheets 10.

A second glass sheet 10a is constructed similar to the glass sheet 10 described above, with or without an electrical element deposited thereon. If an electrical element, for example a resistance film, is employed on the sheet 10a, this sheet may be a duplicate of the sheet 10, as shown in Figs. 3 and 3a. If no electrical element is to be arranged thereon, the sheet 10a may be brought to the condition of sheet 10 shown in Figs. 1 and 1a. A solder paste is then preferably applied over the terminals of the sheet 10a, the same as on the sheets 10.

The glass sheets 10a may also be produced several hundred at a time in a single large glass plate. After completion of the glass sheets 10a, the large plate of glass may be cut into strips, each containing a single row of glass sheets 10a.

A strip of glass sheets 10 and a strip of glass sheets 10a are next arranged such that each glass sheet 10 is in spaced-apart, face-to-face relationship with a glass sheet 10a and with the terminal areas in generally facing relationship and with portions of a pair of leads 20 arranged between the sheets and between the generally facing metallic areas. These lead ends may be T-shaped, L-shaped or otherwise distorted for strength. Heat is then applied to the assembly by induction heating or in a baking chamber to melt the solder, whereby, after cooling of the solder, the leads 20 are securely soldered to the fused terminals. The resulting metal-to-metal bond between the leads and the corresponding terminals, which are, in turn, fused to the glass plates, produces an integral construction of great mechanical strength. The metal-to-metal bond between the leads and the terminals may be in the form of brazing or even welding without departing from the spirit of the invention. The important factor of this particular feature of this embodiment of the invention is that each lead is joined in a metal-to-metal bond to the two associated terminals which are in turn fused to the glass sheets 10 and 10a. This produces an electrical component of great mechanical strength.

Leads for resistors are conventionally 1/32" or approximately 32 mils in diameter, whereby the two sheets 10 and 10a are separated by this distance plus a few mils corresponding to the hard metal applied to the sheets. The space between facing terminals 11 not occupied by the lead ends is filled by the solder paste previously applied to the terminals. The leads preferably do not extend inwardly of the sheets 10 and 10a substantially beyond the inner edges of the terminals 11.

The space between the sheets 10 and 10a and intermediate the terminals 11 is preferably filled by an insulating material which resists penetration by moisture. Silicone cements, silicate type cements, and various easily melted or fused materials have been found satisfactory as a filler, but in the preferred embodiment a small glass sheet 10b is arranged in this space and cemented to both sheets 10 and 10a with a silicone cement. In either such case, the cement is preferably screened on the large plates incorporating a large number of sheets 10 and 10a prior to cutting such plates into strips. In place of, or in addition to, the use of cement, the ends of the small glass sheet may have fused films, soldered to the fused terminals on the outer glass sheets. The glass sheets 10b may be set in place along with the leads 20 when the components are assembled.

The use of a strong filler, such as the suggested glass sheet 10b, adds further to the strength of the assembly since it resists any torque resulting from a squeezing together of corners of the assembly.

It has previously been suggested that both sheets 10 and 10a may have a resistance film applied thereto, where a resistor is being produced. In that construction the two resistance films are in parallel, and if they are of substantially equal resistance value the net resistance is one-half of the resistance of either film. This is particularly desirable where a low resistance is needed, and has the additional advantages of lower current in each individual film and better heat distribution. Additional resistance films or other electrical elements may be applied to the two principal surfaces of the filler sheet 10b, and additional sheets of glass may readily be included in the assembly to provide area for any desired number of resistance films.

It has been suggested above that an evaporated film of chromium with a protective coating of silicon monoxide of magnesium fluoride be employed. However, where a cheaper construction is desired, other films may be employed, for example a thin film of a resistive material such as carbon may be used. It is to be noted that the resistance film need not be strongly bonded to the glass plate 10 since the over-all component is not bonded together through the resistance film but through the terminals 11 and the leads 20.

While the embodiment of the invention described above is a resistor, it will be apparent that an electrical element other than a resistor may be substituted for the resistance film 12. By way of example, two conducting films may be deposited on either surface of either of the glass plates with a dielectric film lying between them whereby a capacitor is obtained. Likewise, a spiral conducting film may be employed to produce inductance, and semi-conducting materials may be employed to produce a transistor or a rectifying diode.

An electric component may vary in many respects from the preferred embodiment described above without departing from the spirit of the invention. In one embodiment of the invention which departs substantially from that described above, a mixture of carbon particles and a good water-resistant cement may be mixed and applied over the entire area of a plain glass sheet such as sheet 10. Another sheet 10a, also perfectly plain, may then be brought against the mixture of cement and conductive particles on the sheet 10 with two leads lying between the sheets and extending only a short distance into the space between the sheets. The cement and conductive particle mixture should, of course, be sufficiently thick that it may contact both sheets when the leads are arranged therebetween. When the cement is allowed to harden or set, the resistor is complete. In this embodiment as well as in others described herein, it may be desired that the lead ends be swaged to provide better anchoring. Such swaged leads are disclosed and described in greater detail in application Serial No. 225,382 referred to above.

Such a resistor has characteristics falling far short of those of the preferred embodiment described above. For example, the resistance would not be predictable accurately, it would not be stable enough electrically to meet many requirements, and the leads would not stand the lead-twisting test required in many applications. The offsetting advantage is, of course, economy. Such a resistor would be extremely cheap to produce since there is only a single application of material to one of the two glass sheets employed. Here again, this application of material could be made while the sheet is still a part of a much larger plate.

It will be apparent that various individual features of the preferred embodiment of the invention might be worked into this much cheaper embodiment to improve selected characteristics of the final resistor. For example, a relatively inexpensive form of resistance film or other electrical element might be arranged on the outer surface of one of the two glass sheets and the leads could then extend well into the space between the two glass plates, the entire assembly being held together by a good grade of water-resistant cement and the electrical element connected to the leads by any suitable means such as edge coating of the glass sheet 10. The leads would then be well anchored at the expense of exposing the electrical element.

As previously indicated, application of most of the various materials employed in the preferred embodiment of the invention is accomplished by screening rather than by rolling, printing or painting because of the greater accuracy obtainable by this method of application. Experiments with the utilization of the method described herein have revealed that each separate screening operation costs only a small fraction of one cent for each sheet 10 or 10a where the sheet comprises one of several hundred included in a single large plate.

If the electrical component is to be a resistor and if the resistance film is deposited by evaporation, the ultimate resistance value can be determined quite accurately in advance by controlling the rate and duration of the evaporation process. However, where still more precise ultimate values are desired, it may be necessary to adjust the resistance value after the deposition of the resistance film and the protective coating. It is possible to effect such adjustment after the deposition of the protective film without disturbing the protective film.

This objective is obtained by depositing on the glass sheet 10, fused conducting areas 21, 22 and 23, as seen in Fig. 7. These areas may be formed in the same manner as the terminals 11 described above. The resistance film 12 is then deposited by evaporation following which the protective coating is applied. As previously indicated, the protective coating fails to form a continuous protective film over the rough fused areas. Accordingly, a conducting paste can subsequently be laid over the conductive strips 21, 22 and 23 to form links 24, 25 and 26. The conductive paste makes contact with the conducting film through the protective film because of the failure of the protective film to form a continuous coating over the rough areas.

One suitable material for this paste has been found to be Du Pont No. 4929 conducting paste.

It will now be seen that the links short circuit portions of the resistance film to produce a lower resistance value than would be obtained if the connecting links were not present.

The resistance value of the over-all resistor is now measured, and if the value is correct, the connecting links are left intact. However, if the resistance value is too low, selected ones of the links 24, 25 and 26 may be broken, for example by wiping with a soft rotating brush. It will be noted that the distance between the various pairs of conducting strips 21, 22 and 23 varies, whereby the wiping away of a selected link 24, 25 or 26 adds different values of resistance to the total resistance of the over-all film. Breaking of the link 24 might, for example, add .5% to the total resistance, and breaking of link 25 or 26 might add 1% or 2%, respectively. The total resistance may be increased, then, by any integral of .5% up to 3.5%. Addition of another pair of fused strips and a connecting link could provide for another increase of 4%, for example, whereby a total increase of 7.5% is possible by breaking all links.

Since the resistance can only be increased, it is preferred that in depositing the resistance film an original resistance, with links intact, be aimed for which is lower than the actual desired value. The desired resistance can then be obtained by wiping away selected ones of the links.

By the means described above the effective resistance of an evaporated film can be adjusted after deposition of a protective coating and without distrubing the latter. Obviously, other types of films may be adjusted in accordance with the same basic method.

In Fig. 8 there is illustrated graphically one method of obtaining a large number of completed elements for electrical components, which elements may be similar to those illustrated in Fig. 3. It will be noted that terminals 11 for adjacent components on the over-all sheet of glass, are separated a short distance in order to facilitate subsequent cutting of the glass along the lines A—A and B—B. It has been found to be better practice not to attempt to cut and break the glass along lines which cross the fused terminals. There is also shown in Fig. 8 one construction of resistor element which permits arrangement of two resistance films, one on each of the two sheets of glass 10 and 10a, in series in the completed resistor component. To this effect the terminal 11, at the right-hand end of each resistor sheet 10 in Fig. 8, is a dummy terminal which is not originally connected electrically to any resistance film. An electrical terminal 31 is employed which is arranged inwardly of the adjacent dummy terminal 11, and to which the resistance film 12 is connected.

Following deposition of the resistance film and the protective coating, and following application of an insulating varnish, all as described above in connection with Figs. 1–3, a conducting paste, which may be similar in character to the links 24, 25 and 26, is applied to each resistor sheet 10 as indicated by reference numeral 32 in Fig. 8.

On each resistor sheet the electrical terminal 31 includes a small tab 33 extending outwardly toward the adjacent dummy terminal 11. The resistive film, the protective coating and the layer of insulating varnish all terminate somewhere within the width of the electrical terminal 31, whereby the tabs 33 remain exposed. When the conducting paste 32 is applied and is arranged to overlie at least a portion of the tabs 33, good electrical connection is thereby made between the paste 32 and the electrical terminal 31. The paste 32 extends preferably to a point at the center of the respective sheet 10.

Any two of the glass sheets 10 which are ultimately cut from the large glass plate of Fig. 8 may now be brought together in such a way that the resistance films of the two sheets are arranged in series rather than parallel. Fig. 9 shows an enlarged view of two glass sheets cut from the glass plate of Fig. 8. It will be noted that the lower one is turned 180° with respect to the upper one. The two glass sheets of Fig. 9 may now be folded together, whereby the two depositions 32 of conducting paste overlie each other at the center of the assembly.

Any filler which is employed over the center portions of the two sheets must be arranged to leave an opening to provide electrical contact between the coincident portions of the paste depositions 32. For example, if the glass sheet 10b is to be employed, a small hole may be etched through the center thereof. A thick deposition of the conducting paste at the center of each glass sheet 10 will readily provide sufficient material to fill the hole in the glass sheet 10b, such that the two paste depositions 32 make electrical contact. Solder paste is, of course, applied to the terminals 11, and leads 20 are properly arranged as described above in connection with Figs. 1–6.

The electrical circuit through the completed resistor component may now be traced from the left-hand terminal 11 of the upper glass sheet of Fig. 9, through the resistance films to the electrical terminal 31 of the same sheet. The current path extends to the tab 33 of the upper glass sheet and to the paste deposition 32 on the same sheet.

The above-described electrical contact between the two paste depositions 32 at the center of the sheets provides a current path to the paste deposition 32 of the lower sheet in Fig. 9. The current then follows to the tab 33 on the lower sheet and carries across the resistance film and to the right-hand terminal 11 of the lower sheet. The two resistance films are thereby arranged in series, this being desirable in the case of high resistance values since any given elongated configuration of the resistance path on the individual glass sheets 10 thereby results in a higher over-all resistance in the completed component.

The series arrangement of resistance films on two similar glass sheets 10 may also be of advantage in other instances. For example, glass plates such as that illustrated in Fig. 8 may be carried in stock, each plate containing a large number of glass sheets 10 of some standard resistance value. The glass sheets 10 of one plate might, for example, have resistance values of 5 ohms while the glass sheets 10 of another plate might have resistance values of 50 ohms. If a small order is received for 55 ohm resistors, these glass sheets 10 may be combined into the construction of Figs. 5 and 6 and with the resistance films arranged in series, whereby 55 ohm resistors are obtained without the necessity of setting up the evaporating apparatus and the adjusting apparatus to provide for individual resistance films of 55 ohms. Similarly, the 5 ohm resistors might be combined with stock supplies of 1 or 2 ohm resistors and arranged in series to obtain 6 or 7 ohm resistance components.

It will be noted that the terminal 11 at the right-hand end of the upper sheet 10 in Fig. 9, and the terminal at the left-hand end of the lower sheet are dummy terminals which are not directly connected to any part of the resistance film. These dummy terminals serve only as means for firmly bonding the glass sheets to the leads, and hence to each other, to form a strong rigid construction. In the completed component the dummy terminals are connected through the leads to the opposing terminals and hence to the resistance film, but they form no active part of the electrical circuit.

In Fig. 8 the various electrical terminals 31 are shown as continuous strips connected together at the top of the glass plate. This arrangement is provided for the purpose of facilitating electroplating of selected portions. Where a relatively low resistance is desired in the over-all resistor component, the resistance inherent in the conducting paste constituting the links 32 may be objectionably high, both because it raises the over-all resistance and because it is relatively unstable. In such cases it is desirable that these paste links 32 be electroplated with a good conducting material such as copper. With this in mind the entire glass plate of Fig. 8 may be dipped into a suitable electroplating solution, the voltage being applied to any desired point on the continuous conducting strip which makes up the various electrical terminals 31. Copper or other suitable conducting material is thereby deposited on all exposed portions of the paste 32, as well as exposed portions of the tabs 33. Preferably, a portion of each tab 33 is left exposed after deposition of the conducting paste, whereby electrolytically deposited metal on the links 32 may make direct contact with such exposed portions of the tabs 33. A direct circuit is thereby obtained between the terminals 31, through the electrolytically deposited material to the center of the sheet 10, rather than having to rely upon any portion of the conducting paste forming the original links 32. It should be noted that no metal will be electrolytically deposited on the terminals 31 where the varnish insulation covers the full area of these terminals.

Contact between the deposited metal at the center of the two facing sheets 10 can then be obtained by screening onto the two sheets a thick layer of conducting paste, or a solder paste may be employed.

If electrolytic deposition of metal is to be avoided, at the expense of relying upon conducting paste as a current carrying medium, it is of course unnecessary to make the electrical terminals 31 in a single continuous strip extending across the entire glass plate of Fig. 8. More specifically, each terminal 31 may terminate inwardly of the edges of the corresponding glass edges of the corresponding glass sheet 10 in a manner similar to the terminals 11.

It may readily be seen by reference to Fig. 8 that the method of adjustment of resistance values, described above in connection with Fig. 7, lends itself to rapid automatic operation while the individual glass sheets 10 are still incorporated in a glass glass plate. Contacts may be made to move along the glass plate of Fig. 8, wiping, as they advance, against the left-hand terminals 11 and the electrical terminals 31 or their tab portions 33. Trailing behind the movable contacts may be a series of rotating brushes alined with the respective links 24, 25 and 26. Depending upon the resistance value measured on each successive resistance film, the selected brushes may be lowered automatically into contact with the glass plate, thereby to wipe away selected ones of the links 24, 25 and 26.

Since the automatic apparatus for measuring and adjusting resistance values does not constitute a part of the present invention it is not described in detail herein. It will be apparent, however, that where such apparatus is employed it is important that the links 24 be aligned, that the links 25 be aligned, and that any further links having equal effect on the resistance value be aligned.

In mass production of components constructed in accordance with the present invention, it may be desirable to employ only one form of terminal arrangement, particularly in view of the suggestion, advanced above, that certain stock values of resistance, for example, might be combined in series to produce resistors of odd resistance values. If a single standard form of terminal arrangement is desired, it would be necessary to employ an arrangement of terminals similar to that shown in Fig. 8 in order that a series arrangement of two films would be possible. The terminal arrangement of Fig. 8 may readily be employed to produce resistor components in which a single resistance film or parallel resistance films are desired. To accomplish this a small area of conducting paste is deposited by screening or by other suitable method over a portion of the right-hand terminal 11 and a portion of the tab 33. This connects the resistance film to the right-hand terminal 11. In this case, of course, the link 32 may be omitted. The same terminal arrangement needed for series arrangements is thereby adapted to components wherein the resistance film is directly connected to the opposed terminals 11 at opposite ends of a single sheet 10. The sheet 10 may then be employed with a blank sheet 10a or may be combined with another sheet 10 having the same or a different resistance value, the two resistance films being arranged in parallel.

Again, if desired, electroplating may be employed to provide a more solid connection between the tab 33 and the right-hand terminal 11.

It will be obvious to one skilled in the art that the various features of the invention illustrated in Fig. 7 and in Figs. 8 and 9 may readily be applied to electrical components other than resistors.

One outstanding feature of the present invention concerns the arrangement of two preformed sheets of insulating material in face-to-face relationship, any desired electrical element being arranged on any one or more of the principal surfaces of the two sheets, and the sheets being arranged in spaced-apart relationship to permit reception of the ends of a pair of leads. The leads are of course electrically connected to the electrical element and the two sheets and the leads are firmly bonded together. This arrangement is an improvement over the arrangements disclosed and claimed in patent applications Serial Nos. 225,382, 299,797 and 338,207, referred to above. In the first of these three patent applications, preformed sheets are employed which are sufficiently plastic to flow around the leads with heat and pressure. In the latter two patent applications, preformed sheets are employed having recesses for receiving the lead ends, whereby the two sheets may contact each other over facing principal surfaces. According to the present invention, neither of these expedients need be resorted to.

In the preferred embodiment of the invention, metallic terminals are fused to the insulating sheets, preferably glass, and the leads are soldered or otherwise brought into metal-to-metal bond with two facing terminals, whereby the entire assembly is firmly bonded into a unitary construction. Alternatively, however, the two sheets, along with the inserted lead ends, may be bonded together by some other adhesive which may or may not incorporate resistance material therein. Where the term "adhesive" is employed herein it is to be interpreted in its broad sense whereby it encompasses any form of bonding material including soldered, brazed, or welded metals.

The mechanical structure of the present invention, in its various embodiments, permits the utilization of the en masse production methods disclosed in the three previously filed patent applications referred to above. More specifically, since sheets of insulating material are employed, the major portion of the production process may be performed while the individual sheets are incorporated in large plates, each of which may include several hundred of the individual sheets.

It will readily be appreciated that three or more leads may be employed in the various embodiments of the invention. Resistors might, for example, be provided with a center tap. Where a third or extra lead is employed with the preferred embodiment of the invention an extra fused terminal may or may not be provided for cooperation therewith.

While particular embodiments of the invention have been shown, it will be understood, of course, that the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. An electrical component comprising a pair of preformed sheets of insulating material, each of said sheets having on one principal surface thereof a pair of spaced-apart metallic films fused to said sheet, said sheets being arranged in spaced-apart, face-to-face relationship with said pairs of metallic films in generally facing relationship, a pair of spaced-apart leads extending into the space between said sheets, each of said leads being joined in metal-to-metal bond with two generally facing ones of said metallic films, whereby said leads and said sheets are firmly bonded together in a unitary structure, and an electrical element arranged on one face of one of said sheets and electrically connected to said leads.

2. The elements of claim 1 wherein said electrical element is arranged on the surface of one of said sheets having one of said pairs of metallic films fused thereto, said electrical element extending between and electrically contacting said metallic films on said one sheet.

3. The elements of claim 1 wherein said preformed sheets are of glass and said metallic films are formed of glass and metal particles, said glass particles being fused.

4. An electrical component comprising a pair of preformed sheets of insulating material, each of said sheets having on one principal surface thereof a pair of spaced-apart metallic films fused to said sheet adjacent opposed edges thereof, said sheets being arranged in spaced-apart, face-to-face relationship with said pairs of metallic films in facing relationship, an electrical element arranged on one face of one of said sheets and electrically connected to said metallic films on said one sheet, a pair of spaced-apart leads extending into the space between said sheets, each of said leads being joined in metal-to-metal bond with two facing ones of said metallic films, whereby said leads and said sheets are firmly bonded together in a unitary structure, and insulating material generally filling the space between said sheets not occupied by the above-recited elements, said insulating material including a sheet of glass of thickness approximating the thickness of said leads between said sheets.

5. The method of making an electrical component which comprises, fusing a pair of spaced-apart metallic films to one surface of a preformed sheet of insulating material, applying an electrical element to one face of said sheet, fusing a spaced-apart pair of metallic films to a second preformed sheet of insulating material, arranging said sheets in spaced-apart face-to-face relationship with said pairs of metallic films in generally facing relationship and with portions of a pair of spaced-apart leads arranged between said sheets and between generally facing metallic films, and joining each of said leads in metal-to-metal bond with each of two facing metallic films and with said leads electrically contacting said electrical element.

6. The method of making an electrical resistor, which comprises, applying mixed glass and metal particles to two spaced-apart areas adjacent opposed edges on one major surface of each of two sheets of glass, applying heat to said particles to melt said glass particles and to fuse said metal particles to said glass sheets to form fused terminals, applying a resistance film to said major surface of one of said sheets of glass with said film electrically contacting said fused terminals thereon, arranging said glass sheets in spaced-apart face-to-face relationship with portions of a pair of spaced-apart leads arranged between said sheets and between generally facing fused terminals and with a third glass sheet arranged between said first-mentioned glass sheets and between said leads, and joining each of said leads in metal-to-metal bond with each of two facing fused terminals.

References Cited in the file of this patent

UNITED STATES PATENTS

| | | |
|---|---|---|
| 2,515,294 | Cowgill | July 18, 1950 |
| 2,640,904 | Gaiser | June 2, 1953 |
| 2,692,321 | Hicks | Oct. 19, 1954 |
| 2,745,931 | Heibel | May 15, 1956 |

FOREIGN PATENTS

| | | |
|---|---|---|
| 4,391/97 | Great Britain | Feb. 18, 1897 |